March 5, 1940.  O. C. SCHMIDT  2,192,818
VALVE
Filed March 13, 1939  2 Sheets-Sheet 1
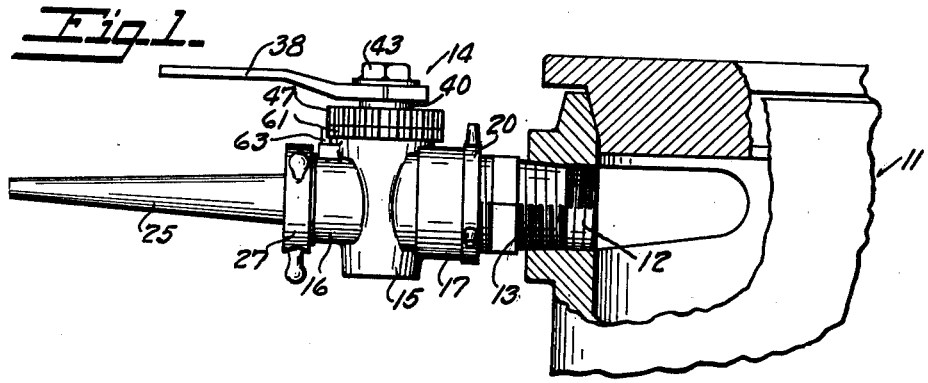
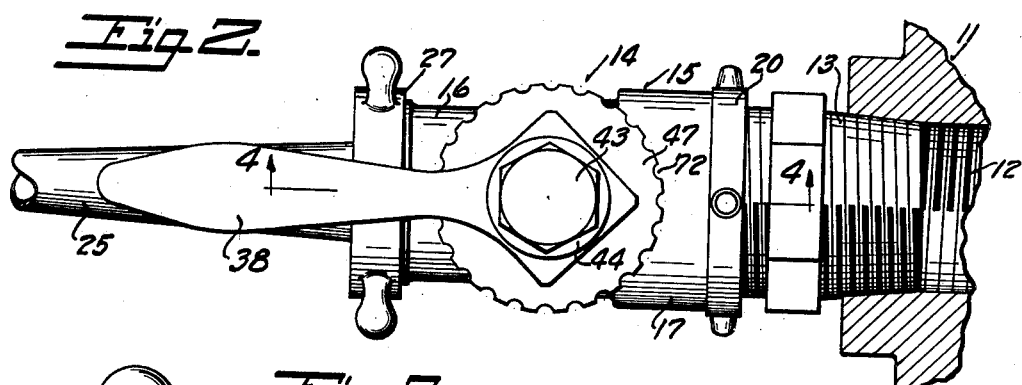
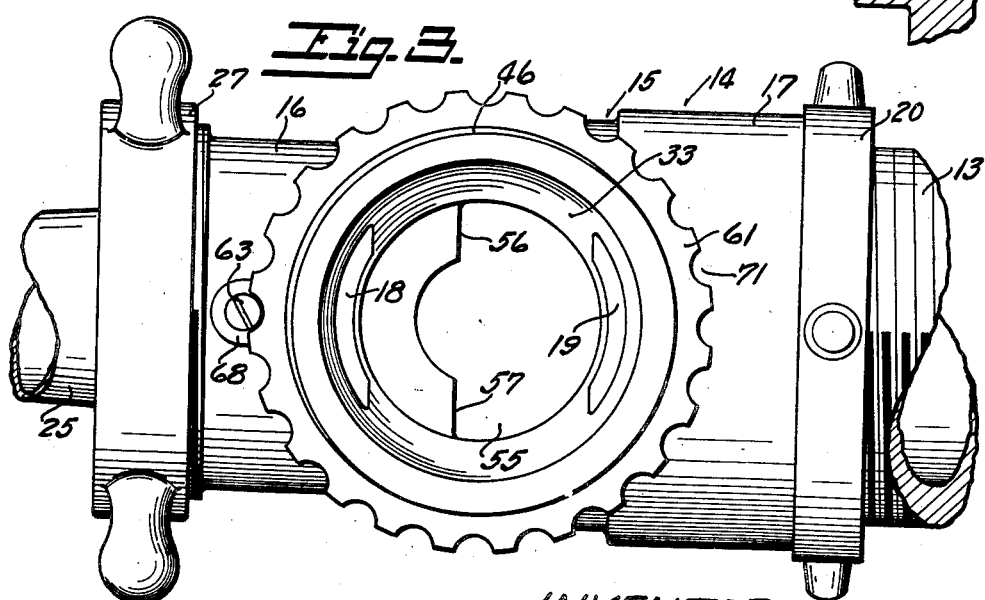
INVENTOR:
Oscar C. Schmidt,
by H. H. Hulsba, His Attorney.

March 5, 1940. O. C. SCHMIDT 2,192,818
VALVE
Filed March 13, 1939 2 Sheets-Sheet 2
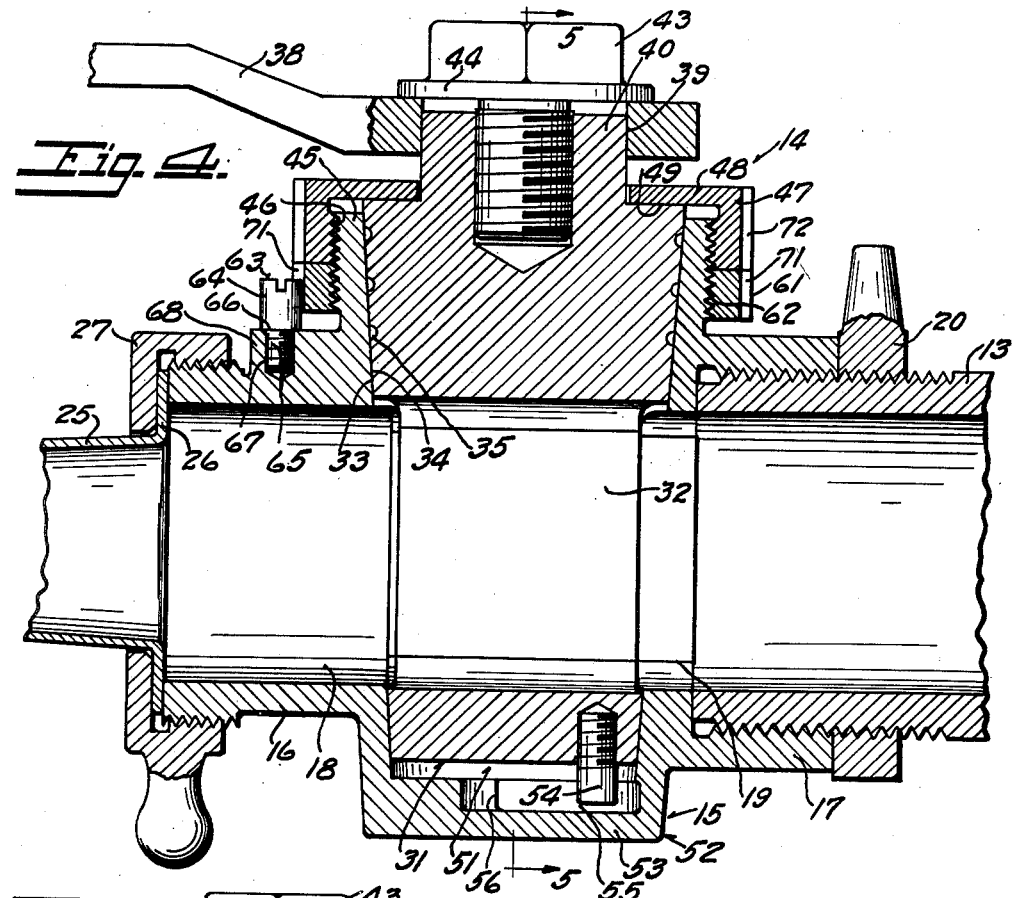
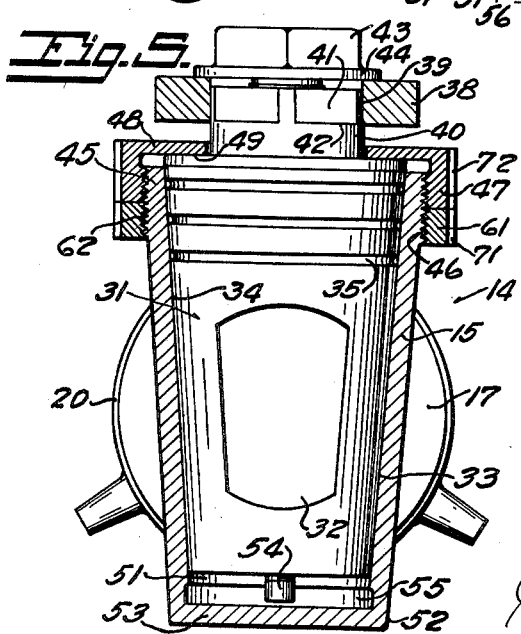
INVENTOR:
Oscar C. Schmidt, Patented Mar. 5, 1940

2,192,818

UNITED STATES PATENT OFFICE 2,192,818

VALVE

Oscar C. Schmidt, Cincinnati, Ohio, assignor to The Cincinnati Butchers' Supply Company, Cincinnati, Ohio, a corporation of Ohio Application March 13, 1939, Serial No. 261,532

8 Claims. (Cl. 251—97)

In certain industries it is necessary to employ valves and to keep the valves in prime condition, and to frequently take the valves apart for cleaning purposes. This is especially true in the food industry in which extreme cleanliness is necessary for producing healthful products, which is encouraged and required by health regulations.

I have exemplified my invention as employed in connection with a so-called stuffing machine for stuffing meat and similar products into containers, such as sausage casings for sausages, pans for meat loaves, and the like. These products contain fat and meat juices which are very penetrating and pass through small crevices and apertures, so that it is necessary to have a closely fitting valve to prevent leakage and to maintain cleanliness, and at the same time it is necessary to have an easily operated valve, because valves of this nature are operated at very frequent intervals. It is also necessary to take the valves apart in order to clean the same and remove all vestiges of food and food juices to maintain the valves clean and to prevent any accumulations of food particles or juices which would spoil and become rancid and might be carried over into subsequent operations if not promptly removed.

In order to provide an easily operated, well fitting valve, it is necessary to provide adjustments for the same, and it is one of the objects of my invention to provide novel adjustments of this character; and, further, to provide novel adjustments and means for readily repeatedly seating the valve in previously adjusted position, upon reassembling of the valve after it has been disassembled and cleaned.

It is the object of my invention, further, to provide novel means whereby to control the seating of the valve, and to provide novel means whereby the valve may be readily reseated in previously adjusted position upon reassembling of the valve parts after cleaning the same; and, further, to provide adjustable locating means which are adjustable to accommodate necessary adjustments of the valve for proper repeated seatings of the latter.

My invention consists in novel means for accomplishing the above stated objects; further, in providing locating means for valve adjustment; further, in providing adjusting means for such locating means; further, in providing adjustable stopping means to act as a stop to movement of the valve seating part of the valve; and, further, in providing holding means for the latter.

I have exemplified my invention in a plug type valve, and my invention consists, further, in providing novel means for controlling the repeated similar seatings of the valve plug; in novel means located about the valve plug for controlling repeated valve seatings; and in novel means for adjusting such controlling means.

The invention will be further readily understood from the following description and claims, and from the drawings, in which latter:

Fig. 1 represents a side elevation of a portion of a stuffing machine, partly in section and partly broken away, and having my invention applied thereto.

Fig. 2 is a plan view of the same, partly broken away.

Fig. 3 is a similar view with the valve plug and its handle removed, and partly broken away.

Fig. 4 is an axial vertical section of my improved device, taken on the line 4—4 of Fig. 2, and partly broken away; and, Fig. 5 is an axial cross-section of the same, taken in the plane of the line 5—5 of Fig. 4, and partly broken away.

The outlet end of a usual stuffing machine is shown partly broken away at 11, and is provided with an outlet port 12 for the material, such as ground meat or meat dough, which is pressed or exuded out of this port by a usual piston in the stuffing machine. One end of a nipple 13 is threaded into this port. A valve 14 comprises a casing 15, having threaded annular portions 16, 17 at the outer ends of feed passages 18, 19, whose adjacent ends are arranged to communicate with each other. The portion 17 is internally threaded and is threaded over the other threaded end of the nipple 13 and is releasably secured to said nipple by a threaded gland 20. A suitable feeding part 25, shown as a usual feeding nozzle, is releasably secured to the valve casing. It is provided with a flange 26 by means of which it is releasably clamped to the valve casing by a flanged threaded gland 27, releasably threaded over the threaded portion 16.

The valve is shown as a plug valve, and comprises a valve plug 31, through which there is a feeding passage 32. The valve casing is provided with a valve seat 33 for the valve plug, which latter is provided with a coacting face 34, the coacting faces of the valve plug and its seat being preferably tapering or conical. The valve seat is located between the adjacent ends of the passages 18 and 19 in the valve casing. The valve plug is arranged to be turned in its seat so as to present the ends of its feeding passage to the sides of the valve seat in the casing to close the valve, to locate its feeding passage in line with the feeding passages in the casing to fully open the valve, or to place its feeding passage in intermediate positions for partially closed or partially open relation of the valve. The valve plug is preferably provided with grooves 35, shown annular, which are packing grooves to arrest leakage of meat and meat juices.

The valve plug is provided with a handle 38 having a socket 39, received over a stem 40 which is part of the valve plug, the wall of the socket and the stem being so shaped as to locate the handle about the valve plug, as by providing the same with relatively angular faces 41, so that the handle may be placed at various angular positions with relation to the passage in the valve plug. The handle rests on shoulders 42 on the valve stem, and is clamped to the valve stem by means of a bolt 43 having an annular flange 44 to close the socket in the handle and to clamp the handle to the valve plug.

The taper bore of the valve casing is shown extended in an annular or tubular extension 45 of the valve casing, concentric with the axis of the valve seat. This extension is shown externally threaded at 46.

In order to hold the valve plug in its seat and to cause proper engagement between the coacting conical or taper faces 33, 34, respectively of the valve casing and the valve plug, an adjustable seating part 47 for the valve plug is provided, this seating part being shown as a nut provided with an inwardly extending annular flange 48, received over an annular shoulder 49 on the valve plug, and arranged to adjust the valve plug in its seat by rotation of the nut 47 to move the valve plug into selective contact thereof with its seat in axial direction and to relieve such contact.

In the present exemplification the entering end of the valve plug is shown received in a cavity 51, which extends into a bulge 52 of the valve casing lengthwise of the valve seat, and provided with an outer end closing wall 53 for closing the end of smaller diameter of the bore of the valve seat. The lower end of the valve plug is provided with a lug 54, shown in the form of a screw threaded into the lower end of the valve plug. This lug extends into a recess 55 in the outer end wall 53 and is arranged to engage the respective ends 56, 57 of said recess at the limits of opposite rotative movements of the valve plug, representing respectively fully closed positions of the valve plug when the handle 38 is rotated in opposite directions to full extent, intermediate positions of the valve handle rotating the valve plug into various positions for fully open relation of the valve when the handle is in mid-position between its limits of movements and various intermediate open or closed relations of the valve plug when the handle is at other intermediate positions. When the handle is in mid-position the passage 32 in the valve plug is in line with the feeding passages 18, 19 in the valve casing, with the uninterrupted portion of the taper face of the plug in coactive relation with the uninterrupted portion of the taper face of its seat at the sides of the casing, and when the passage 32 in the valve plug is at right angles to the passages 18, 19, the ends of the walls of the passage 32 and the proximate portions of the taper face of the valve plug coact with the uninterrupted portion of the taper face of the valve seat, or the taper face of the valve plug closes the passages 18, 19, or both said closing relations obtain, to definitely interrupt feeding of the material through the valve and to close the valve.

To enable the valve to be employed for uses in which frequent cleanings of the same are necessary, as in the food industry, I provide means whereby to readily reassemble the valve, with the valve seating parts in definitely and predetermined similar coactive relations at each reassembling thereof. To accomplish this in a plug valve, I provide means whereby the tapering or conical surface of the valve plug is placed in definite relation with its tapering or conical valve seat lengthwise of its axis at each reassembling thereof, so as to insure against leakage between it and the valve seat and for proper facility in turning the valve plug.

In the present exemplification I have provided locating means in the form of a collar 61 about the tubular extension 45, and means for locating the same in selected definite positions lengthwise of said extension to form a stop for limiting seating movement of the adjusting part or nut 47 to definitely locate the valve plug with relation to its valve seat at each replacement of the same after disassembling and cleaning the valve, insuring that the valve seating shall be the same without readjustment after each removal of the valve plug for cleaning purposes.

The stop for the valve adjusting part is preferably a part having adjustable connection relative to the valve casing and so placed as to limit seating movement of the valve plug in axial direction. The connection between the casing and the stop is preferably a micrometrically acting connection, and is exemplified as a threaded connection on the outer peripheral face of the extension 45 of the valve casing. The connection between the adjusting part 47 and said extension is also preferably micrometrically acting to micrometrically adjust the seating pressure between the coacting conical faces of the valve plug 31 and its seat 33. The stop, locating part or collar is shown as a nut and as having threaded connection 62 with the extension 45, the threads 46 being shown extended for the purpose, and the collar or nut 61 being shown internally threaded to said extension. The location of the collar or nut 61 lengthwise of the tubular extension 45 fixes the point to which the adjusting nut 47 may be screwed inwardly for forcing the valve plug to its seat by means of the flange 48 thereof.

The locating collar or nut 61 is preferably fixed in its adjusted position, determined by the proper position of the adjusting nut 47, constituting said locating collar or nut a definite stop for said adjusting nut, by being secured with relation to the valve seat, as by holding the same non-rotatively to the casing, and thereby holding or locking the same in adjusted position. These holding means are exemplified as a screw 63, having a head 64, a threaded shank 65, and a shoulder 66 between the head and the shank. The shank is threaded into a threaded hole 67 in the casing, the outer end of this hole being shown in a boss 68 of the casing.

The locating collar or nut 61 is provided with peripheral recesses 71, arranged with suitable frequency about its outer periphery, and the screw 63 is so placed that its head 64 is located in a selected peripheral recess when the locating nut has been properly adjusted for limiting adjustable movement of the adjusting nut 47. The adjusting nut is also preferably provided with peripheral recesses 72 arranged with suitable frequency about the outer periphery of the nut. After the locating nut has been adjusted properly, with a peripheral recess thereof in registry with the threaded hole 67, a peripheral recess in the adjusting nut is brought into registry with the last-mentioned peripheral recess in the locating nut, as by reversely rotating the adjusting nut in order that the screw 63 may be passed lengthwise of said placed peripheral recesses and screwed into its threaded hole, with the head thereof located unprojectingly within the peripheral recess 71 in the locating nut.

Rotation of the adjusting nut in locations outwardly endwise of the locating nut may take place in order that the adjusting nut may be rotated to retract the same, to take the valve apart while the locating nut remains in place and to return the adjusting nut to previously adjusted position, in which latter it is jammed upon the locating nut to maintain the adjusting nut in previously adjusted position.

In the use of the valve it is frequently necessary to remove the valve plug in order that all faces and parts of the valve which may be contacted by the food or its juices during use of the valve, may be thoroughly cleaned and all food and food juice particles removed therefrom. Such disassembling of my improved valve is readily accomplished by unthreading the adjusting nut 47, and removal endwise of the valve plug out of its seat, whereupon the parts may be thoroughly flushed and cleaned. The handle 38, the bolt 43 and the adjusting nut 47 may be removed with the valve plug. The adjustable locating collar or nut 61 remains in place.

Upon reassembling of the valve, the valve plug is inserted in its valve seat and the adjusting nut 47 is threaded over the threaded extension 45 of the casing and is threaded against the locating collar or nut 61, which has remained in place, and is adjustably fixed non-rotatively to said extension, so that the adjusting nut 47, by means of its flange 48, coacting with the annular shoulder 49 on the valve plug, moves the valve plug in axial direction into its seat for proper coactive relation between the valve face of the valve plug and its seat. The adjusting nut in such reseating of the valve plug is screwed forcefully against the locating nut, the nuts serving as coacting jam nuts to hold the adjusting nut in relocated position to prevent unscrewing thereof by operation of the valve plug.

If wear should take place between the coacting faces of the valve plug and its seat, or if it be desired that a different adjustment between such faces be provided, the holding means, namely, the screw 63, is removed and the locating nut 61 is moved axially toward or away from the adjusting nut, as by rotation thereof on its screw connection with the casing, so as to place the locating nut in a new desired location according to the adjustment desired between the valve plug and its seat.

If desired, the adjusting nut 47 may be adjusted for proper seating of the valve plug in its seat while the locating collar 61 is out of range of the nut 47, and the locating collar 61 may then be moved into forced contact with said adjusting nut to form jam connection therewith while the adjusting nut is in adjusted position, so as to locate subsequent limits of movement of the adjusting nut 47 into previously adjusted position, without the necessity of readjustment of the same, upon subsequent reassemblings of the valve. Such jam connection prevents rotation of the adjusting nut 47 by friction contact of the valve plug therewith, so as to insure that the valve plug remains properly seated in its adjusted relation throughout its operation and after repeated cleanings and reassemblings of the valve.

My improved device permits the parts to be quickly reassembled with the assurance that their previously adjusted locations shall be definitely re-established.

The walls of the indentations respectively on the adjusting nut 47 and the threaded collar 61 may be employed either manually or by means of a suitable wrench to obtain ready rotation of the nut and collar respectively. If desired, the outside diameter of the adjusting nut 47 may be reduced to the depth of the indentations and other turning means provided thereon. The outer end of the adjusting nut 47 may be caused to contact the handle to release the valve plug by pressure thereon, if desired.

While I have shown the stop as comprising a threaded collar 61 and the holding or locking means for the stop as comprising a screw 63, it is obvious that other adjustable locating means and holding means may be employed, and that other changes in the structures, arrangements and relations of the parts of my improved device may be made, without departing from the spirit of my invention as set forth in the accompanying claims.

I claim:

1. In combination, a valve casing having a tapered valve seat, a tapered valve plug in said seat, adjusting means having adjustable connection with said casing and located about said valve plug in said seat to adjust said plug in axial direction in said seat, and adjustable definitive locating means to similarly locate said adjusting means and means for fixing said locating means in definitive adjusted position for repeated similar adjustments of said plug in its seat by coaction of said adjusting means with said adjusted and fixed definitive locating means.

2. In a take-apart valve, the combination of a valve casing having a valve seat, a rotatable valve plug in said seat, said casing and said plug having material contacted faces, said valve plug removable from its seat to take said valve apart for cleaning the material contacted faces thereof, a plug adjusting means located about the axis of rotation of said valve plug in its seat and adjustable with relation to said valve seat for adjustment of said valve plug to properly seat said valve plug in its valve seat upon reassembling of the valve, and locating means for said plug adjusting means and fixing means to fix said locating means in fixed relation to said valve seat to similarly locate said plug adjusting means in similar adjusted relation to said valve seat at each reseating of said valve plug by said adjusting means in order to similarly seat said valve plug in its valve seat throughout repeated reassemblings of the valve.

3. In combination, a valve casing having a tapered valve seat, a tapered valve plug in said seat, adjusting means located about the axis of said plug and adjustable parallel with said axis to adjust said plug in said seat, and adjustable locating means with which said plug adjusting means coact to repeatedly similarly locate said plug in its seat and located about the axis of said plug and adjustable parallel with said axis and fixing means for said locating means to fix said locating means in definite adjusted relation to said valve seat to repeatedly and similarly locate said plug in said previously adjusted position by similar coactions of said adjusting means with said adjustable and fixed locating means upon repeated reassemblings of said valve after repeated disassemblings of the same.

4. In combination, a valve casing having a tapered valve seat, a rotary tapered valve plug in said seat, plug adjusting means located about the axis of rotation of said plug and adjustable parallel with said axis into definite position to properly adjust said plug in said seat, adjustable locating means located about the axis of said plug and adjustable parallel with said axis into proper position for coactive relation of said plug adjusting means therewith when the latter is in said definite position and securing means to fix said locating means in said proper position throughout repeated disassemblings and reassemblings of the valve in order to repeatedly locate said plug in said previously adjusted position upon such repeated reassemblings of said valve after such repeated disassemblings of the same.

5. The combination of a valve casing having a tapered valve seat and a tubular portion about the end of greater diameter of said valve seat, said tubular portion being externally threaded, a tapered valve plug in said seat, an adjusting collar and a locating collar on said tubular portion and adjustable lengthwise thereof, said adjusting collar having threaded connection with said external threading of said tubular portion to micrometrically adjust said adjusting collar thereon and having operative connection with said valve plug to micrometrically adjust the same endwise in said seat, and holding means for said locating collar to fixedly locate said locating collar in definite relation to said casing throughout repeated adjustments of said adjusting collar and for coaction of said adjusting collar therewith to similarly locate said adjusting collar at repeated adjustments of said adjusting collar for repeated similar adjustments of said valve plug.

6. In a take-apart valve, the combination of a valve casing having a conical valve seat, a conical rotatable valve plug in said seat, said casing having a tubular portion about said valve plug in said seat, said tubular portion being externally threaded, an adjusting collar and a locating collar on said tubular portion and adjustable lengthwise thereof, said adjusting collar having threaded connection with said external threading of said tubular portion to micrometrically adjust said adjusting collar on said tubular portion and having operative connection with said valve plug to micrometrically adjust the same endwise in its seat, and means to fixedly locate said locating collar in definite relation on said tubular portion for repeated similar coactions of said adjusting collar therewith for repeated similar adjustments of said valve plug, and said adjusting collar at said repeated coactions making jam connection with said fixedly located locating collar for holding said adjusting collar during said repeated similar adjustments thereof, whereby to hold said adjusting collar in adjusted position during rotations of said valve plug.

7. The combination of a valve casing having a tapered valve seat and a tubular portion about the end of greater diameter of said valve seat, a tapered valve plug in said seat, said tubular portion being externally threaded, an adjusting collar and a locating collar each threaded on said tubular portion and adjustable lengthwise thereof to provide micrometric adjustment between said respective collars and the taper of said valve seat, said adjusting collar having operative connection with said valve plug to adjust the same endwise in said seat for adjusting the pressure between the coacting faces of said plug and said seat, said locating collar provided with angularly arranged peripheral formations, and holding means coacting with said respective formations and fixed in angular relation to said casing for micrometrically locating said locating collar in definite axial relation to said casing to so fix said locating collar to said casing throughout repeated adjustments of said adjusting collar and for repeated coactions of said adjusting collar with said locating collar to similarly locate said adjusting collar at repeated adjustments of said adjusting collar for repeated similar adjustments of said valve plug.

8. In a take-apart valve, the combination of a casing provided with a conical valve seat, a conical valve plug for being seated in said valve seat and being rotatable therein, said valve seat and said valve plug having coacting conical seating faces, an adjusting part threaded with relation to said casing and having operative connection with said valve plug to adjust the seating pressure between said seating faces, an adjustable shoulder about the axis of rotation of said valve plug and adjustable lengthwise of said valve seat, with which adjustable shoulder said adjusting part coacts for locating said adjusting part in valve plug adjusted position, and means to fix said shoulder in adjusted position whereby to fix the limit of movement of said adjusting part lengthwise of said valve seat to fix the limit of movement of said valve plug into said valve seat upon successive reassemblings of said valve.

OSCAR C. SCHMIDT.